United States Patent
Berkun et al.

(10) Patent No.: US 8,662,396 B2
(45) Date of Patent: Mar. 4, 2014

(54) METHOD FOR REPRODUCING AND USING A BAR CODE SYMBOL

(75) Inventors: Kenneth A. Berkun, Kailua, HI (US);
Lee Felsenstein, Palo Alto, CA (US);
Peter B. Keenan, Los Altos, CA (US)

(73) Assignee: Labels That Talk, Ltd, Kailua, HI (US)

( * ) Notice: Subject to any disclaimer, the term of this patent is extended or adjusted under 35 U.S.C. 154(b) by 390 days.

(21) Appl. No.: 12/848,853

(22) Filed: Aug. 2, 2010

(65) Prior Publication Data

US 2011/0036909 A1    Feb. 17, 2011

Related U.S. Application Data

(63) Continuation-in-part of application No. 12/079,241, filed on Mar. 24, 2008, now abandoned.

(60) Provisional application No. 60/919,689, filed on Mar. 23, 2007.

(51) Int. Cl.
*G06K 7/10* (2006.01)

(52) U.S. Cl.
USPC .................. 235/462.1; 235/454; 235/494

(58) Field of Classification Search
USPC ......... 235/462, 472, 494, 462.1, 462.25, 470, 235/454, 487
See application file for complete search history.

(56) References Cited

U.S. PATENT DOCUMENTS

| | | | |
|---|---|---|---|
| 4,337,375 A | 6/1982 | Freeman | |
| 5,378,881 A | 1/1995 | Adachi | |
| 5,406,024 A | 4/1995 | Shioda | |
| 5,489,769 A | 2/1996 | Kubo | |
| 5,550,365 A | 8/1996 | Klancnik et al. | |
| 5,631,457 A | 5/1997 | Fukuda et al. | |
| 5,938,727 A | 8/1999 | Ikeda | |
| 6,042,014 A * | 3/2000 | Zanetti | 235/493 |
| 6,095,418 A | 8/2000 | Swartz et al. | |
| 6,144,848 A | 11/2000 | Walsh et al. | |
| 6,437,229 B1 | 8/2002 | Nobumoto | |
| 6,574,441 B2 | 6/2003 | McElroy | |
| 6,629,635 B1 | 10/2003 | Akamine | |
| 7,028,911 B2 | 4/2006 | Cheung et al. | |

(Continued)

FOREIGN PATENT DOCUMENTS

| | | |
|---|---|---|
| EP | 1101351 | 5/2001 |
| EP | 1190375 | 3/2002 |

(Continued)

OTHER PUBLICATIONS

Olympus Optical Co. Ltd. Annual Report (1999), ScanTalk Reader R200 pp. 18.

*Primary Examiner* — Michael G Lee
*Assistant Examiner* — Tabitha Chedekel
(74) *Attorney, Agent, or Firm* — Christopher A. Wiklof; Launchpad IP, Inc.

(57) ABSTRACT

A segmented 2D matrix symbol may be formed by dividing data into a plurality of segments, separately encoding the plurality of segments as corresponding arrays of cells, and arranging the arrays of cells in an abutting relationship. The segmented symbol may be reproduced, for example by receiving a bitmap corresponding to the formed symbol followed by printing; by copying a printed symbol; or by scanning a printed symbol and printing a copy. The reproduced symbol may be scanned, and data from only decoded segments, for example audio data, may be output.

18 Claims, 11 Drawing Sheets

(56) References Cited

U.S. PATENT DOCUMENTS

| | | |
|---|---|---|
| 2002/0037168 A1 | 3/2002 | Horii et al. |
| 2003/0012557 A1 | 1/2003 | Tingey et al. |
| 2003/0048882 A1 | 3/2003 | Smith, II |
| 2003/0136837 A1 | 7/2003 | Amon et al. |
| 2003/0155368 A1 | 8/2003 | Giancarlo |
| 2003/0189089 A1 | 10/2003 | Raistrick et al. |
| 2004/0173687 A1* | 9/2004 | Lapstun ............ 235/494 |
| 2004/0246529 A1 | 12/2004 | Pruden et al. |
| 2005/0010409 A1 | 1/2005 | Hull et al. |
| 2005/0041120 A1 | 2/2005 | Miller |
| 2005/0197158 A1* | 9/2005 | Silverbrook et al. ...... 455/556.2 |
| 2005/0199699 A1 | 9/2005 | Sato et al. |
| 2006/0054702 A1 | 3/2006 | Lei |
| 2006/0111967 A1 | 5/2006 | Forbes |
| 2006/0249573 A1 | 11/2006 | Berkun |

FOREIGN PATENT DOCUMENTS

| | | |
|---|---|---|
| EP | 1183641 | 12/2002 |
| JP | 07-085085 | 9/1993 |
| JP | 2001-51368 | 2/2001 |
| JP | 2001-108513 | 4/2001 |
| WO | WO0232108 | 4/2002 |
| WO | WO0232109 | 4/2002 |
| WO | WO02069243 | 9/2002 |
| WO | WO2004008378 | 1/2004 |

\* cited by examiner

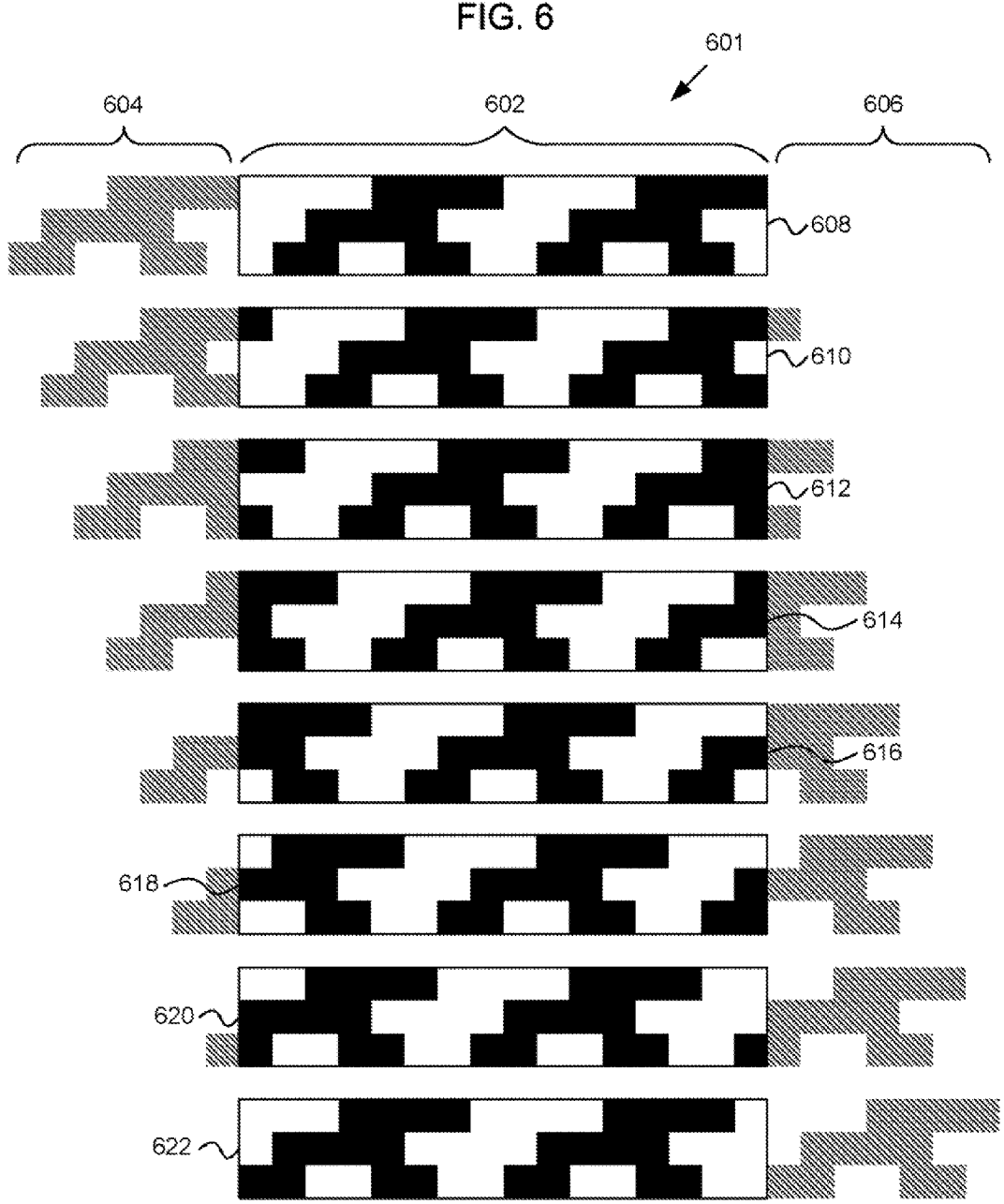

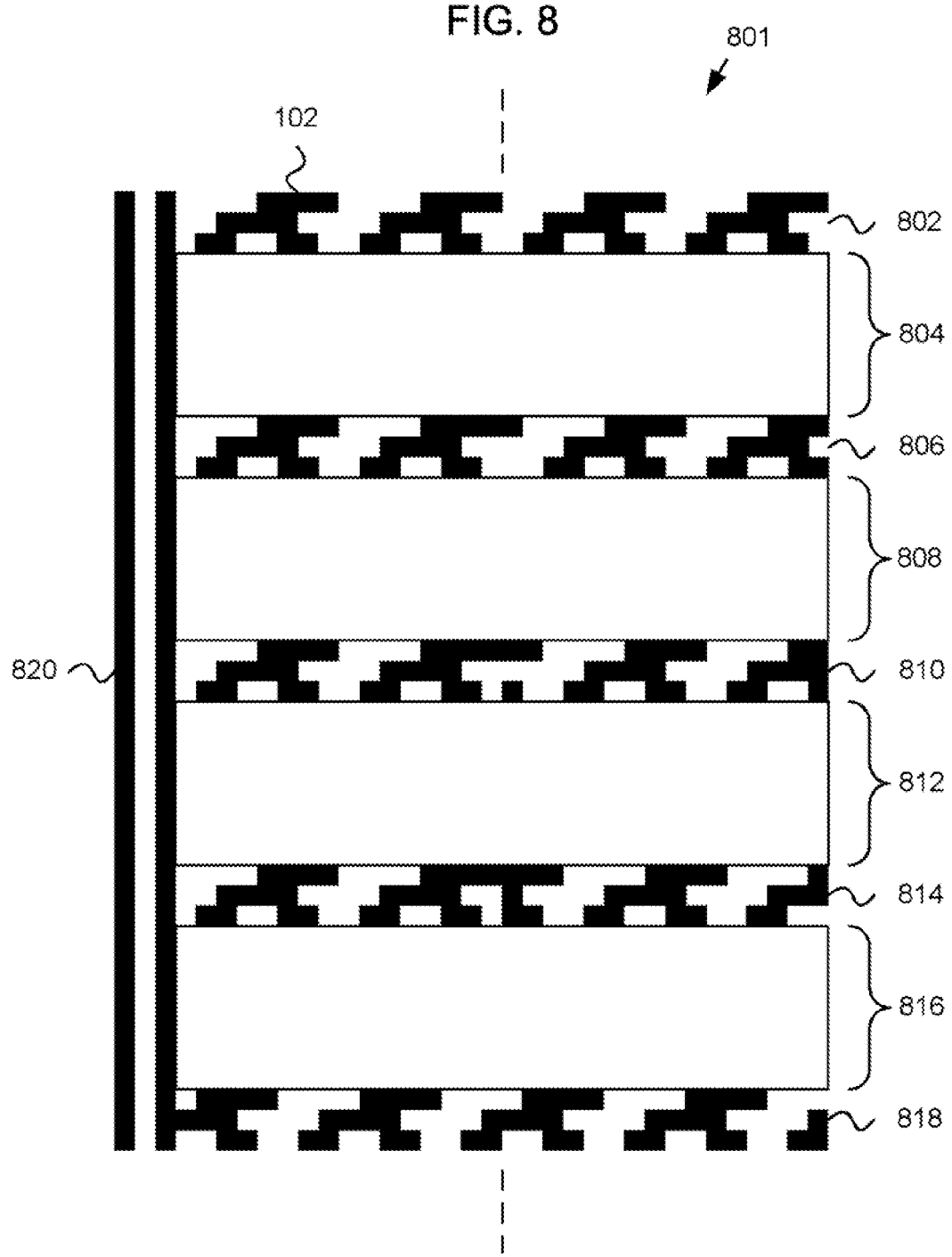

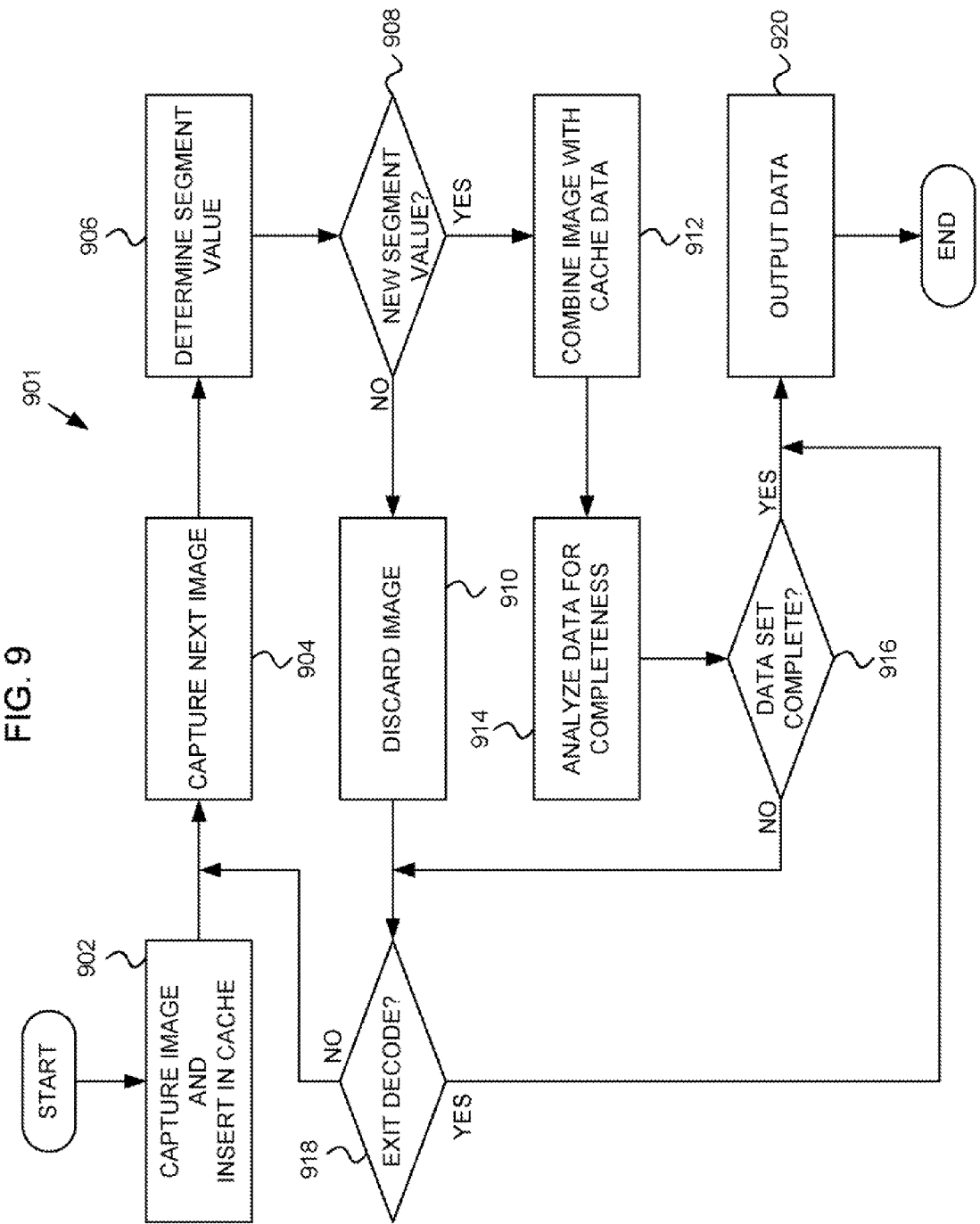

US 8,662,396 B2

METHOD FOR REPRODUCING AND USING A BAR CODE SYMBOL

CROSS-REFERENCE TO RELATED APPLICATIONS

The present application is a Continuation-In-Part from, claims priority benefit from, and to the extent not inconsistent with the disclosure herein, incorporates by reference U.S. patent application Ser. No. 12/079,241, entitled METHOD AND APPARATUS FOR READING A PRINTED INDICIA WITH A LIMITED FIELD OF VIEW SENSOR, filed Mar. 24, 2008, copending herewith; which claims priority benefit from U.S. Provisional Patent Application No. 60/919,689, entitled A METHOD FOR READING A MULTIDIMENSIONAL PATTERN USING OPTICAL SENSOR, filed Mar. 23, 2007, and which is also, to the extent not inconsistent with the disclosure herein, incorporated by reference.

This application relates to subject matter found in the U.S. patent application Ser. No. 12/079,240, entitled METHOD AND APPARATUS FOR USING A LIMITED CAPACITY PORTABLE DATA CARRIER, filed on the same day as U.S. patent application Ser. No. 12/079,241, and, to the extent not inconsistent with the disclosure herein, incorporated by reference.

BACKGROUND

Bar code symbols have been used for many years in industrial, distribution, and retail environments. More recently, two dimensional (2D) symbologies were developed that increase the data storage capacity of earlier linear symbologies. 2D symbols made according to such symbologies were also used in typical industrial, distribution, and retail environments, but added the capability, in some applications, of providing additional information without real-time access to a network and a database.

The size of 2D symbologies dictated at least the use of error detection with enhanced robustness, and also generally required the use of error correction, owing to the tendency of scanning devices to not detect a portion of a given symbol. Error correction was applied across the entire symbol. That is, if a given portion of data from the symbol was not read, then symbol-wide error correction could be used to reconstruct the missing data, resulting in a valid read of the symbol. However, if too much of the printed symbol was damaged, even if the damage was localized to only a particular area in the symbol, then the error correction for the symbol could be insufficient to reconstruct the symbol, and none of the symbol would be decoded.

However, in certain emerging markets, all the data in the symbol may not be needed for the symbol to be useful. In particular, if a small portion of the symbol is heavily damaged, then it may be useful to read the remaining portions of the symbol using error correction data corresponding to those remaining portions. Accordingly, there is a need for a symbol that can undergo significant damage to a portion of the symbol, but still be read to recover data from other, relatively undamaged portions of the symbol. Moreover, it may be useful to reproduce such a symbol, such as by printing from a bitmap or photocopying, and distributing and/or scanning copies of the symbol.

OVERVIEW

According to an embodiment, a bar code symbol formed by steps including dividing data into a first plurality of segments; separately encoding a second plurality of segments as corresponding arrays of cells; and arranging the arrays of cells in an abutting relationship may be received in the form of a bitmap image. The bitmap image may be printed.

According to an embodiment, a bar code symbol formed by steps including dividing data into a first plurality of segments; separately encoding a second plurality of segments as corresponding arrays of cells; and arranging the arrays of cells in an abutting relationship may be received as a printed symbol. The printed symbol may be copied or otherwise scanned and printed.

According to an embodiment, a bar code symbol formed by steps including dividing data into a first plurality of segments; separately encoding a second plurality of segments as corresponding arrays of cells; and arranging the arrays of cells in an abutting relationship may be received as a bitmap image or a printed symbol. The bitmap image or printed symbol may be reproduced. The reproduced symbol may be read by a bar code reader.

BRIEF DESCRIPTION OF THE DRAWINGS

FIG. 6 is a set of eight bitmap patterns corresponding to the bitmap pattern FIG. 5, each pattern shown at a phase offset that encodes a value.

FIG. 8 is an embodiment of a 2D matrix bar code symbol that includes a plurality of data segments.

FIG. 9 is a flow chart showing a process for reading a symbol with segmented data, according to an embodiment.

DETAILED DESCRIPTION

Figure 1:
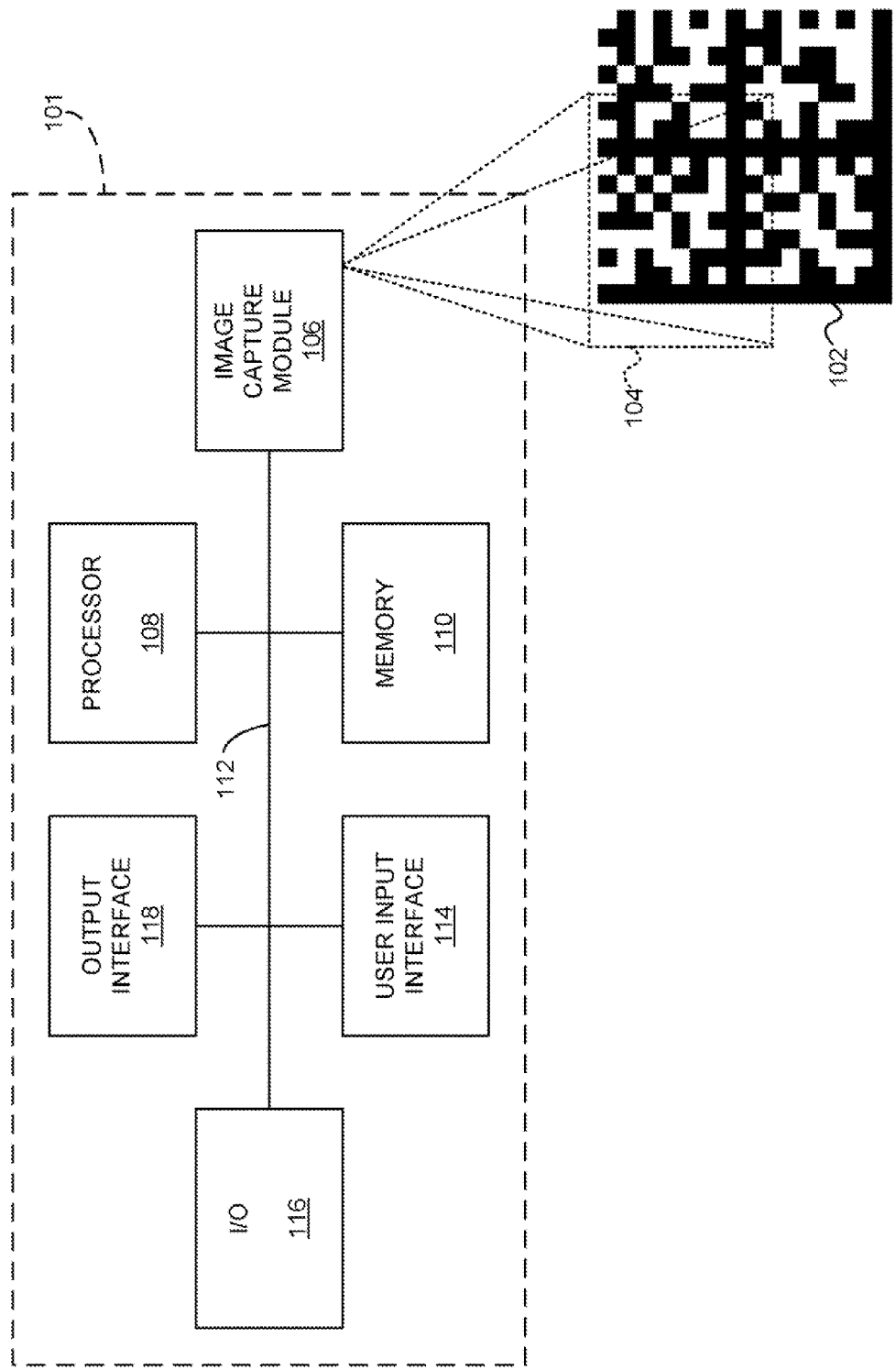
FIG. 1 is a block diagram of an end device having an ability to construct data from a symbol having greater physical extent than the corresponding field-of-view of the end device, according to an embodiment.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein.

According to embodiments, this disclosure includes techniques for using an optical sensor such as an integrated single-chip camera to read two dimensional (2D) patterns, wherein the field of view of the sensor is smaller than at least one dimension of the pattern.

FIG. 1 is a block diagram of an end device 101 having an ability to read and reconstruct data from a symbol 102 having greater physical extent than the corresponding field-of-view 104 of the end device, according to an embodiment. The end device 101 may, for example, be embodied as a dedicated bar code reader, may be embodied as an image capture device plus a host PC, may include a hand-held computer, or may be integrated into and/or include a cell phone, digital audio player, digital video player, or other electronic apparatus.

The end device 101 includes an image capture module 106 operable to capture a plurality of images of fields of view 104 having less extent than an entire symbol 102. The limited extent of the field of view 104 relative to the entire symbol 102 may be related, for example, to the resolution of the image capture module 106, such as wherein the number of resolvable pixels captured by the capture module 106 is less than the number of cells in the symbol 102 times a sampling frequency, such as the Nyquist sampling frequency. Alternatively, for end devices 101 having resolution enhancement capability based on a priori knowledge of the symbol structure, the number of resolvable pixels captured by the image capture module 106 may be less than the number of cells in the symbol 102 times a factor somewhat less than the Nyquist sampling frequency. According to other embodiments, the image capture module 106 may have sufficient resolution to capture the entire symbol 102, but geometric factors, uncertainty in aiming direction, lack of user training, etc., may necessitate reconstructing data from an entire symbol 102 from a plurality of images of fields of view 104, each comprising less than the full extent of the symbol 102.

According to various embodiments, the image capture module 106 may include a focal plane detector array, such as a CMOS or CCD array, combined with appropriate optical, mechanical, and control elements. Alternatively, the image capture module 106 may include a non-imaging detector such as a scanned beam image capture apparatus. According to an embodiment, the image capture module, optionally with at least a portion of the user input interface 114, such as a trigger, may be packaged and configured for communication with the other blocks shown in FIG. 1, which may be embodied as a PC. According to an embodiment, the end device 101 includes a microprocessor, microcontroller, or other electronic control apparatus forming a processor 108 operable to execute computer instructions such as expressed in software, firmware, state machine configuration, etc. The end device 101 may also include memory 110 such as random-access memory, flash memory, read-only-memory, static memory, etc. operable to provide at least temporary image storage, workspace, and program space. The memory 110 may be present as a permanent or removable device operatively connected to the processor 108 and capture module 106 across a bus 112, and/or may be present as embedded memory in the processor 108. The memory 110 may comprise a contiguous memory, such as on a single die, or may be distributed across plural physical devices, and/or be divided or allocated logically to various functional portions.

The end device 101, according to embodiments, also includes a user input interface 114, such as a trigger, keypad, pointer, etc., an optional computer interface 116 operable to communicate with other devices, and/or an optional output interface 118, such as an audio output, display, and/or other visual, tactile, or audio indicator.

In operation, the end device 101 may receive one or more commands from a user through the user input interface 114 to capture a sequence of images of respective fields of view 104 of a relatively large symbol 102. The processor 108 may responsively drive the image capture module 106 to capture the images and transfer at least a representation of the successive images to the memory 110. As described elsewhere herein, the processor 108 may execute computer instructions to assemble at least two captured images into a larger image of the entire symbol 102. Alternatively, the processor 108 may convert the received images into data representations and combine the data representations into a representation of the data encoded in substantially the entire symbol 102. Of course, if less than the entire symbol 102 is captured during a sequence of images, then the microprocessor 108 may alternatively reconstruct the amount of image or the amount of data that was captured.

According to an embodiment, the end device 101 may transmit the reconstructed data or image through the computer interface 116 to a remote resource. Alternatively, the end device 101 may express data decoded from the symbol 102 through an output interface 118. For example, when the symbol 102 encodes audio data, the processor 108 may run an audio codec or transfer the data to a hardware audio codec embedded within the output interface 118. The corresponding output file may then be played to a user through an amplifier and through a speaker or headphone jack included in the output interface 118.

According to embodiments, the end device 101 may be configured to run software or firmware to determine a location of or decoding segment identification fields. The end device 101 may also be configured to run software of firmware to decode data segments corresponding to the segment identification fields. According to various embodiments, such software or firmware may include computer executable instructions for performing or using: a plurality of computational methods, image processing, performing a Fourier transform, a phase mask, a chipping sequence, a chipping sequence along an axis, pattern matching in the image domain, pattern matching in the frequency domain, finding bright spots in the frequency domain, synthesizing data from a neighboring data segment, pseudo-decoding data from a neighboring data segment; a finder pattern, finding parallel edges, finding a finder pattern, centers decoding, image resolution using a priori knowledge of symbol structure, closure decoding, edge finding, uniform acceleration compensation, surface de-warping, anti-aliasing, frame transformation, frame rotation, frame de-skewing, keystone correction, Gray Code, pattern phase, phase comparison, delta distance, local thresholding, global thresholding, modulation compensation, image inversion, inverted image projection, sampling image regions positioned relative to a finder, etc.

Figure 2:
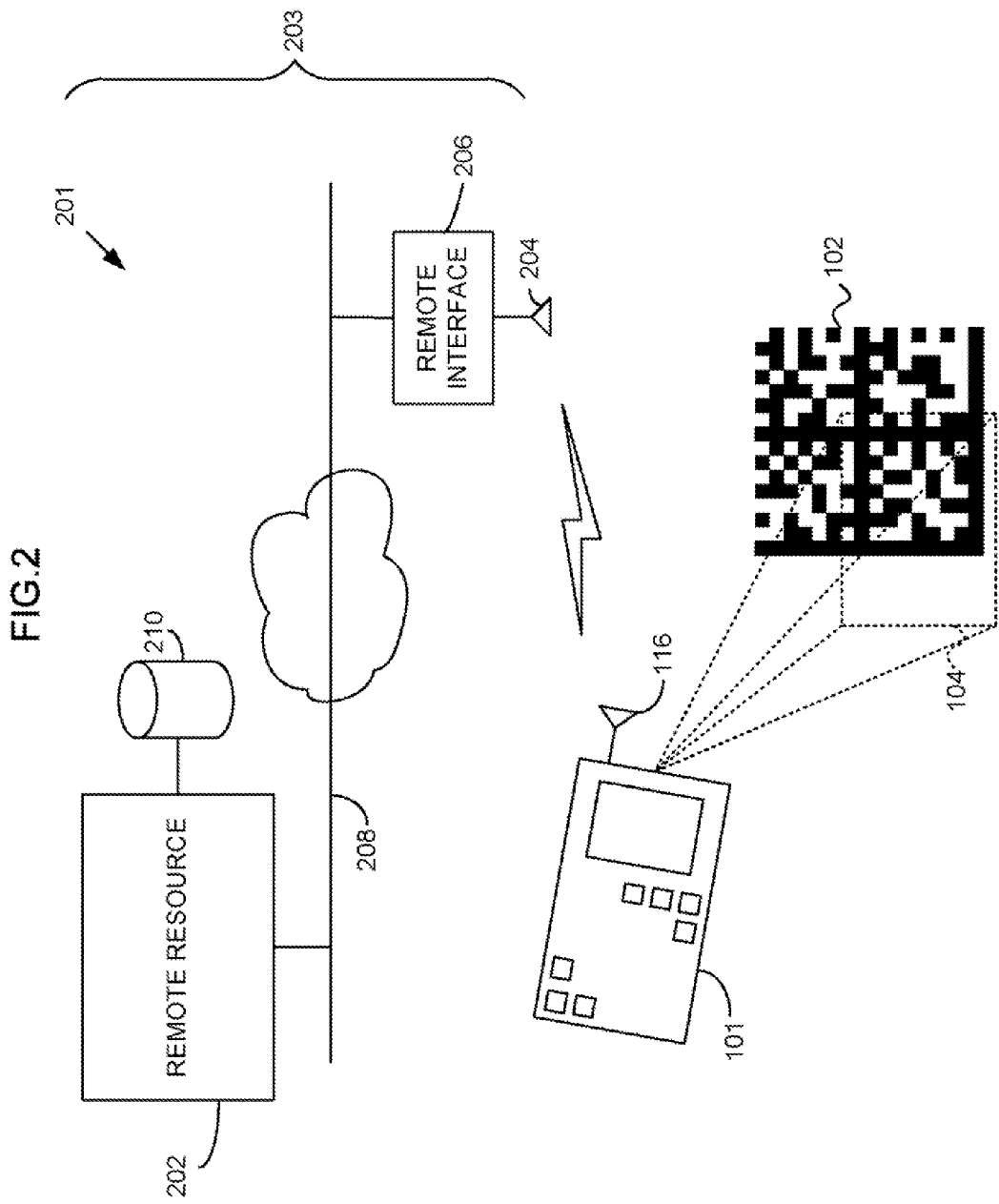
FIG. 2 is a block diagram of an end device configured to capture a series of images of a symbol having greater extent than the images and a remote resource configured to reconstruct data corresponding to the symbol from data corresponding to the series of images, according to an embodiment.

FIG. 2 is a diagram 201 of an end device 101 operatively coupled to a remote system 203 having an ability to reconstruct data from a symbol 102 having greater physical extent than the field-of-view 104 of the end device, according to an embodiment. The end device 101 may transmit a sequence of captured partial images corresponding to the field of view 104 of the symbol 102 to a remote resource 202 for processing and reconstruction of data corresponding to a plurality of the captured partial images. Optionally, the remote resource may include video, audio, or other output interfaces and may play back content corresponding to the reconstructed data. Optionally, the remote resource may store the reconstructed data and/or transmit data corresponding to the reconstructed data to another resource (not shown) or back to the end device 101 for playback.

The remote system 203, collectively represented as a remote resource 202 with coupled data storage 210, data channel or network 208, remote interface 206 and physical interface 204 may be embodied as disparate apparatuses; or alternatively may be embodied as a single apparatus, such as a personal computer for example. The data transmission channel between the end device interface 116 and the remote interface 206 may include a wired channel such as electrical or guided optical signals, or may include a wireless channel such as radio or infrared. The remote interface 206 may, for example, include a gateway, access point, router, switch, interface card, embedded chipset or other apparatus having a physical interface 204 operable to communicate with the end device 101.

According to an embodiment the end device 101 may include a cell phone or other personal communications device and the remote interface 206 may represent a portion of a cellular network. The remote interface 206 may operate to route the sequence of captured images to the remote resource 202 over a network 208 such as the Internet. The remote resource 202 may include a server accessible via the network 208. The remote resource 202 may include a facility for reconstructing the sequence of captured partial images into a set of data corresponding to the symbol 102. As with local processing in the end device 101 described above, such reconstruction may involve reconstruction of an entire image or may involve reconstruction of data from the image. According to some embodiments, the server may then return the reconstructed data to the end device 101, such as for playback, or may store the reconstructed data in a storage apparatus 210 for later retrieval by the end user.

According to an alternative embodiment, the end device 101 may reconstruct the data from the symbol 102 and then access the remote resource 202 to retrieve associated data held in a database on the storage apparatus 210, to report access to the database, to process a transaction, etc.

According to embodiments, the end device 101 and the remote system 203 may cooperate to perform some or all of the functions described above in conjunction with FIG. 1.

Figure 3:
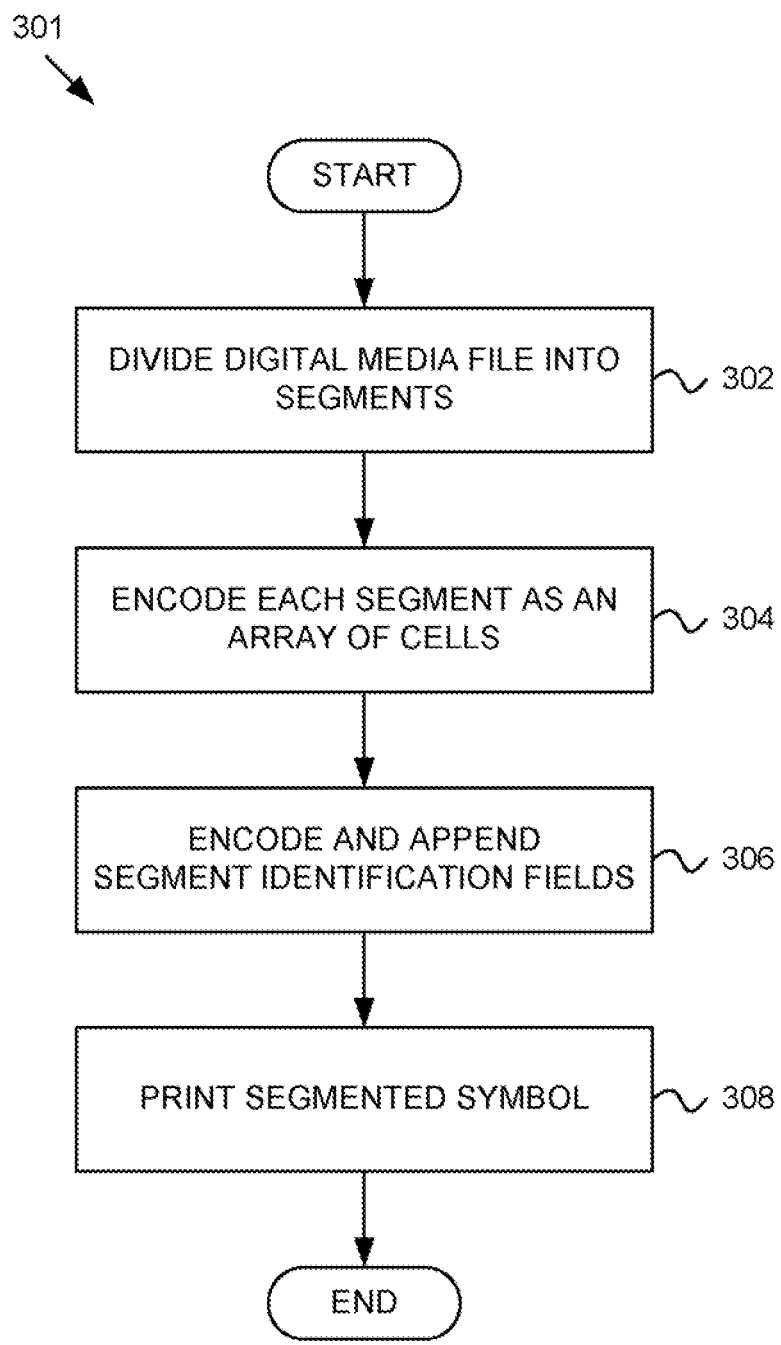
FIG. 3 is a flow chart showing a process for encoding and printing a segmented data symbol, according to an embodiment.

FIG. 3 is a flow chart showing a process 301 for encoding and printing a segmented data symbol, according to an embodiment. The process 301 may be performed on a computing resource, such as an end device, a host computer, or a network resource. Alternatively, the process 301 may span a plurality of computing resources. The process 301 may be embodied as a single executable program, or alternatively may span a plurality of programs According to an embodiment, a relatively large data set may be broken up into a plurality or series of smaller data sets. Each of the smaller data sets may be referred to as a segment. A symbol corresponding to the segmented data set may be formed as printed data field segments corresponding to the data segments. Beginning at step 302, a received data file is divided into segments. Data segments, and hence data field segments, may be formed in substantially equal sizes, or alternatively may be formed as variable sizes. For example, a data file may include an audio file or a video file of perhaps 10 seconds duration. The data file may be divided into 10 segments representing about 1 second of recording each.

Proceeding to step 304, non-omitted data segments may each be encoded as a printed representation according to rules for a printed symbology. For example bytes or bits of data in the data segment may be mapped to corresponding locations in a two-dimensional array, and the mapped locations assigned a value corresponding to black or white, according to an encoding algorithm for a 2D bar code symbology, such as a 2D matrix bar code symbology. The array size may be assigned according to a fixed selection, according to an algorithm (including a look-up table) that is a function of data segment capacity, or according to one or more other criteria. For example, FIG. 8 illustrates a segmented symbol including four printed data field segments 804, 808, 812, and 816.

According to an embodiment, the graphical mapping of the data to the rules of a symbology may automatically add finder and/or index patterns generally provided to ease the processing burden on a bar code reader. Such finder patterns may be used as-is, or alternatively standard finder patterns may be omitted and substitute finder patterns may later be inserted.

Proceeding to step 306, segment identification fields may be calculated and/or encoded and appended to the data field segments. For example, referring again to FIG. 8, segment identification fields 802, 806, 810, and 814 respectively encode 00, 01, 02, and 03 that respectively identify data field segments 804, 808, 812, and 816. Calculating and/or encoding segment identification fields may also include forming overhead fields such as segment identification field 818, which does not identify a data field segment per se, but rather indicates the end of the symbol. Similarly, one or more finder and/or index patterns such as pattern 820 may be determined and appended to the data field segments and segment identification fields.

While step 306 refers to segment identification fields, it may additionally or alternatively involve encoding or bitmapping an appending at least one framing feature. A framing feature may for example include at least one finder pattern, at least one clocking pattern, at least one indexing pattern, at least one segment identifier, or other feature selected to provide spatial and/or logical context to the data segments.

According to embodiments, a segment identification field may include a pattern having a fixed geometry of substantially irregular or non-repetitive shape. The pattern may be replicated over the length of a segment identification field. The patterns may be grouped, such as to provide multi-digit segment identification indices. Shifting the patterns a selected number of cells may express a phase value that encodes a segment identification digit.

The segment identification fields and data field segments may then be combined to form one or more images of printable symbols.

Proceeding to step 308, the constructed image may be output, such as printed to a file, printed on paper in a computer printer, typeset for reproduction on a printing press, or otherwise prepared for and/or output on a physical medium.

Figure 4:
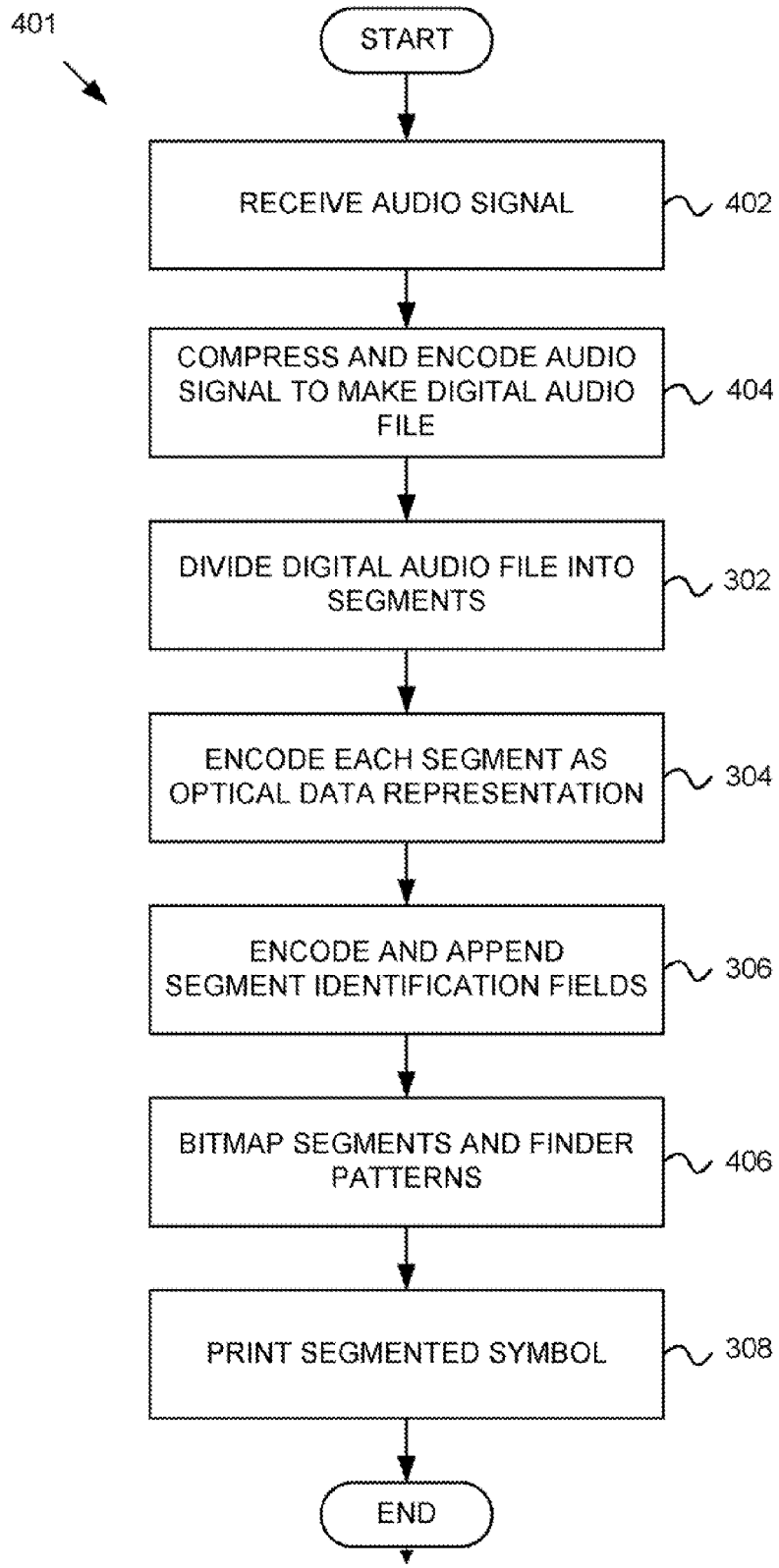
FIG. 4 is a flow chart showing another process for encoding and printing a segmented data symbol, according to an embodiment.

FIG. 4 is a flow chart showing a process 401 for encoding and printing a segmented data symbol, according to an embodiment for encoding audio files. As with the process 301 of FIG. 3, the process 401 may be performed on a computing resource, such as an end device, a host computer, or a network resource. Alternatively, the process 401 may span a plurality of computing resources. The process 401 may be embodied as a single executable program, or alternatively may span a plurality of programs.

Beginning at step 402, an audio signal is received, and in step 404, the audio signal may optionally be compressed and is encoded into a desired format. For example, the audio signal received at step 402 may be received by a microphone operatively coupled to an end device 101 (e.g. as in FIGS. 1 and 2) or to a computing platform 203 (e.g. as in FIG. 2). As described above, the computing platform may be substantially limited to a personal computer or may extend across a network. In another embodiment, a digital audio file may be received directly and step 402 may be omitted. A conventional audio coding format such as MP3, MP4, AAC, etc. may be used.

Proceeding to step 302, received data file is divided into segments. Data segments, and hence data field segments, may be formed in substantially equal sizes, or alternatively may be formed as variable sizes. For example, a data file may include an audio file or a video file of perhaps 10 seconds duration. The data file may be divided into 10 segments representing about 1 second of recording each. According to another embodiment, an audio file may be divided into segments that respectively represent phonemes, beats, measures (bars), phrases, or other features existent or impressed upon the data file; or groups of such features. Thus, step 302 may include data analysis to determine break points between segments. Optionally, one or more segments may be omitted, such as to eliminate "dead air" or undesirable transients, to compress the file for encoding, etc.

According to an embodiment, step 302 may optionally include distribution of audio file information among segments. That is, a particular segment need not necessarily represent a contiguous time span of the audio file, but rather may include some data representative of a plurality of time spans up to a portion of substantially all the time spans. A segment identification field, optionally in cooperation with an external database, a set of data distribution rules, or other convention may encode a data distribution algorithm for use in reconstruction of an audio file. Alternatively, a substantially consistent convention may be used to distribute data among data segments.

Proceeding to step 304, non-omitted data segments may each be encoded as a printed representation according to rules for a printed symbology. For example bytes or bits of data in the data segment may be mapped to corresponding locations in a two-dimensional array, and the mapped locations assigned a value corresponding to black or white, according to an encoding algorithm for a 2D bar code symbology, such as a 2D matrix bar code symbology. The array size may be assigned according to a fixed selection, according to an algorithm (including a look-up table) that is a function of data segment capacity, or according to one or more other criteria. For example, FIG. 8 illustrates a segmented symbol including four printed data field segments 804, 808, 812, and 816.

According to an embodiment, the graphical mapping of the data to the rules of a symbology may automatically add finder and/or index patterns generally provided to ease the processing burden on a bar code reader. Such finder patterns maybe used as-is, or alternatively standard finder patterns may be omitted and substitute finder patterns may later be inserted.

Proceeding to step 306, segment identification fields may be calculated and/or encoded and appended to the data field segments. For example, referring again to FIG. 8, segment identification fields 802, 806, 810, and 814 respectively encode 00, 01, 02, and 03 that respectively identify data field segments 804, 808, 812, and 816. Calculating and/or encoding segment identification fields may also include forming overhead fields such as segment identification field 818, which does not identify a data field segment per se, but rather indicates the end of the symbol. Similarly, one or more finder and/or index patterns such as pattern 820 may be determined and appended to the data field segments and segment identification fields.

Proceeding to step 406, the segments (including segment identifiers) may be bitmapped. Additionally and optionally, one or more finder patterns and/or indexing patterns may be bitmapped. Optionally, the segments may be bitmapped to locations that are out of order with respect to the encoded audio file. This may be used, for example, to distribute adjacent file portions around a symbol to make the symbol more immune to damage, poor scanning technique, etc. For example, if a corner of a symbol is destroyed or otherwise made unreadable, such damage could render a decoded audio file unusable if the damaged corner encoded a key portion of the audio stream. Conversely, if the damaged corner contains small amounts of data from throughout the audio file, then the audio file may remain usable, even if degraded in sound quality.

Proceeding to step 308, the bitmap from step 406 may be printed or otherwise prepared for physical output. According to an embodiment, a 2D bar code pattern substantially larger than the field of view of a camera sensor may be reconstructed using hidden indexed separators. The sequence of segments need not be read in any particular order, contiguous or otherwise, since the indexing property permits the reconstruction of the order of segments. For example, a consumer device such as a cell phone camera may be used to effectively read large data files expressed as 2D bar code symbols.

Figure 5:
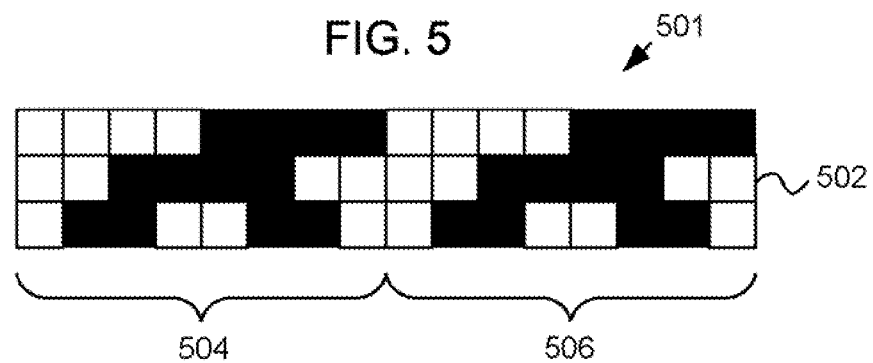
FIG. 5 is a bitmap pattern that may be used to encode segment locations in a segmented bar code symbol, according to an embodiment.

FIG. 5 illustrates a bitmap pattern 501 that may be used to encode segment locations in a segmented bar code symbol, according to an embodiment. A grid 502 is shown to clarify the relative positions of light and dark elements or cells in the pattern. According to embodiments, the grid 502 may be omitted in a typical printed symbol. The 3×16 grid 502 includes two respective repeats 504, 506 of an eight element Gray Code pattern. The Gray Code Pattern is non-repeating within its length.

FIG. 6 depicts a set 601 of eight bitmap patterns corresponding to the bitmap pattern 501 of FIG. 5. A set of boxes illustrate a region of interest (ROI) 602 within which two-repeat Gray Code patterns are shifted in position along an axis, in this case the horizontal axis. The boxes are shown for clarity and may be omitted in a typical printed symbol. Shaded patterns 604 and 606 are included to clarify the logic corresponding to the Gray Code pattern shifting within the ROIs 602. According to embodiments that use a two-repeat Gray Code pattern to encode segment location in a segmented bar code symbol, the shaded patterns 604 and 606 may respectively represent a "circular" wrapping of the repeated Gray Code pattern upon itself. According to embodiments that use a larger number of repeats of the Gray Code pattern (more than two), the shaded patterns 604 and 606 may represent additional printed elements that extend beyond the ROI 602.

The Gray Code pattern 502 of FIG. 5 may encode information according to its relative left-to-right shift in location relative to a ROI 802. The shift in position of the Gray Code pattern 502 may be referred to as a phase shift. Generally, each shift in phase may correspond to a whole number of elements along the shift axis. According to the example 601, each successive shift is from left-to-right by a distance of one element.

The phase shifted patterns within the ROIs 602 may be designated to represent respective modulo eight values. For example, the ROI 608 may represent a zero phase shift that corresponds to a value "0". ROI 610 shows the Gray Code patterns phase shifted by +1, and accordingly the pattern in ROI 610 may represent a value "1". Similarly, the patterns within ROIs 612, 614, 616, 618, 620, and 622 may respectively represent values 2, 3, 4, 5, 6, and 7.

Figure 7:
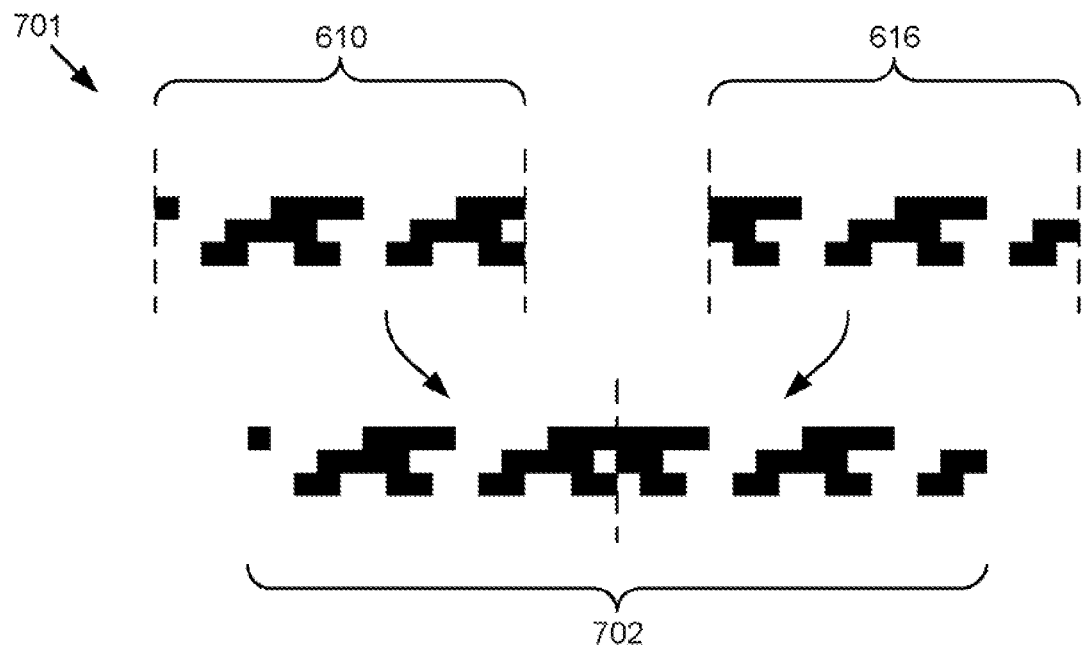
FIG. 7 is a diagram of an approach to construction of a two-digit segment identification field using the phase shifted patterns of FIG. 6, according to an embodiment.

FIG. 7 illustrates an approach 701 to construction of a two-digit modulo 8 number using phase shifted, two repeat Gray Code patterns, according to an embodiment. (A modulo 8 number may also be referred to as an octal number). A bitmap corresponding to a two digit number may be formed by concatenating patterns corresponding to two single digits. According to the illustrated embodiment, each of the two bitmaps corresponding to single modulo 8 digits may include two repeats of a respective Gray Code pattern. A Gray Code pattern 610 corresponds to a value "1". A second Grey Code pattern 616 corresponds to a value "3". The respective Gray Code patterns 610, 616 are shown delimited by dashed lines to clarify their positions. The dashed lines are not part of the respective patterns.

A single two-digit bitmap 702 is formed by placing the Gray Code patterns 610 and 616 in an abutting relationship. The leftmost (most significant) digit 610 may be placed on the left and the rightmost (least significant) digit 616 may be placed on the right. Thus the pattern 702 represents octal "13". Bitmaps corresponding to values with more digits may similarly be formed by placing the least significant digit on the right, the next least significant digit abutting to the left, etc. Alternatively, another spatial relationship may be defined between the Gray Code patterns for forming multi-digit numbers.

FIG. 8 illustrates an embodiment 801 segmented bar code symbol 102 that includes a plurality of data segments 804, 808, 812, and 816. The rectangles corresponding to each data segment are shown for clarity and are not literally printed. The dashed lines above and below the symbol 802 are provided to make it easier to see the juncture between the two digits of the Gray Code segment identifiers 802, 806, 810, 814, and 818, and are not a part of the printed symbol. The rectangles 804, 808, 812, and 816 represent areas where elements or cells may be printed. The elements may be printed, for example, in 8 element groups, each group representing a byte of data. According to the illustrated embodiment, each of the data segment regions 804, 808, 812, and 816 has a capacity of 32 cells wide by 8 cells high, which may be defined to contain 4 bytes wide by 8 bytes high, for 32 byte capacity each. Of course, the capacity of the data segments 804, 808, 812, and 816 may be increased or decreased according to application requirements. The segments 804, 808, 812, and 816 may alternatively be made non-substantially equal in size, and may be allocated to fit the data.

Associated with each data segment is a respective data location field, shown immediately above each corresponding segment. The data location field 802 encodes a two-digit Gray Code octal value 00. Thus, the corresponding data segment 804 may be regarded as data segment 00. Similarly, the data location field 806, associated with data segment 808, encodes an octal value 01, and thus data segment 808 is labeled data segment 01. Following a similar pattern, data location field 810 labels data segment 812 data segment 02, and data location field 814 labels data segment 816 as data segment 03. Data location field 818 encodes octal "55". According to an embodiment, a data location field value 55 identifies the end of the symbol.

Three bars (one white bar between two black bars) on the left side of the symbol embodiment 801 form a finder pattern 820 for the symbol. A reading apparatus may search for the finder pattern 820 to determine the location of a symbol, an approach that may significantly decrease overall computation time. The illustrative finder pattern 820 may also act as a registration feature that may be used to determine an axis along which the data segments are placed (parallel to the bars) and for determining a zero location in the horizontal axis and a feature for determining the phase of the Gray Code patterns 802, 806, 810, 814, and 818.

The explicit encoding of relative data positions shown in FIGS. 5-8 represents one approach for encoding a segmented symbol and is not the only method contemplated. While the Gray Code sequence is shown here for clarity in illustrating the phase offset method of identification, other sequences of cells displaying a non-repeating pattern may be used, for example. According to an alternative embodiment, it is not necessary for the Gray Code digit patterns to include a whole number of repetitions. For example, a second, third, etc. repeat of a Gray Code pattern for a digit may be truncated to reach a selected data segment width. Other modulus numbers may alternatively be used in place of the modulo 8 system illustrated above.

Segmented data symbols such as symbol 801 may be captured in images smaller than the entire extent of the symbol, and the images or data corresponding to the images reconstructed to receive data spanning a plurality of images, up to substantially the entirety of the data. The association of the segment identification fields with the data segments may reduce or eliminate the need to scan a symbol 102 in a particular order. A series successive images smaller than the extent of the symbol may be reconstructed according to the segment identification fields 802, 806, 810, 814, and 818 embedded within the images, regardless of the particular order of segment capture.

In some applications it may be undesirable for a bar code symbol to use a finder pattern that is readily identified by the human eye, such as that that draws attention to itself and distracts from the aesthetics of product packaging. In these applications the bar code symbol may be an integral part of the package design or may be located adjacent to photographs or pictures which are intended to be the main focus of the customers attention.

While the human eye is extremely sensitive to regular patterns having high spatial frequency coherence, the eye is relatively insensitive to patterns having coherent phase relationships and low spatial frequency coherence. The separator patterns thus appear to the eye to merge with the randomized data pattern and cannot be distinguished. Mathematical convolution operations, however, may extract both the regularity of the patterns and the phase relationship data attached to these patterns. For applications where minimization of visual conspicuousness is desirable, the finder pattern 820 may be omitted and the segment identification fields 802, 806, 810, 814, and 818 may be used to provide a finder pattern functionality.

FIG. 9 is a flow chart showing a process 901 capturing and decoding a segmented data symbol, according to an embodiment. As with the processes of FIGS. 3 and 4, the process 901 may be performed on a computing resource, such as an end device, a host computer, or a network resource. Alternatively, the process 901 may span a plurality of computing resources. The process 901 may be embodied as a single executable program, or alternatively may span a plurality of programs.

Figure 10:
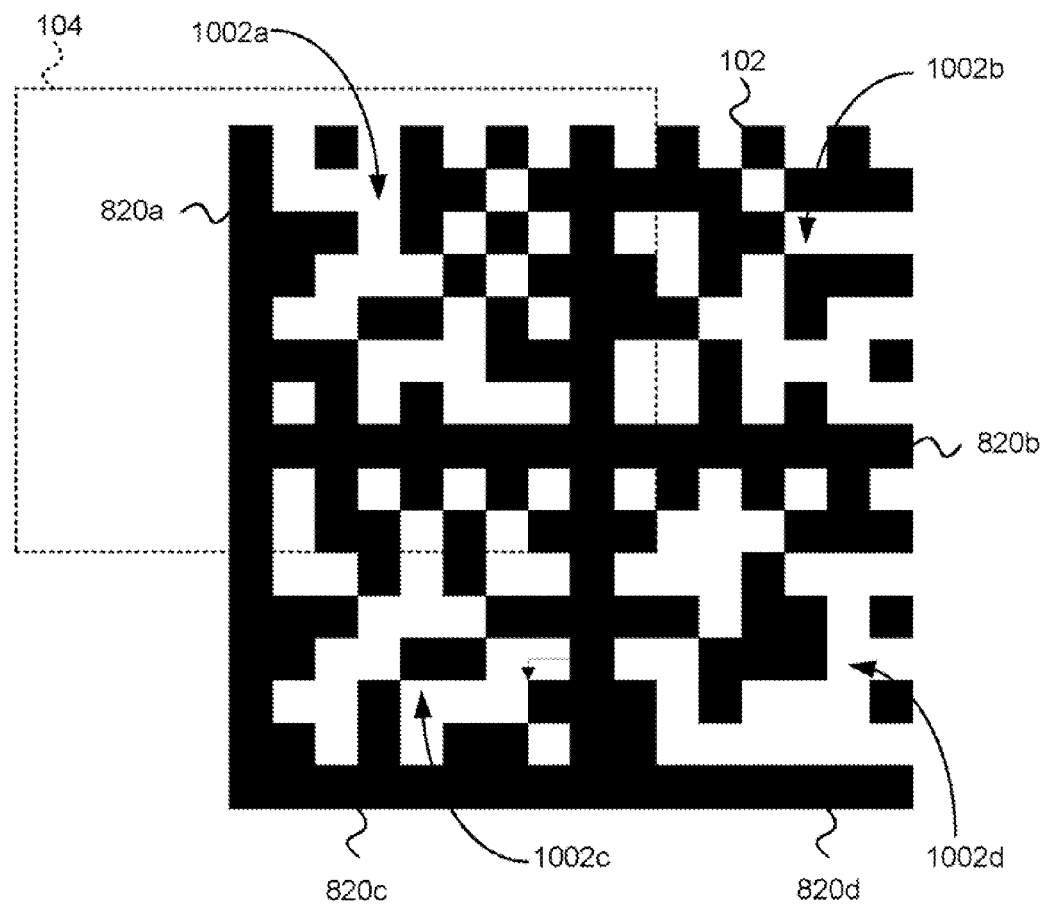
FIG. 10 is a depiction of a 2D matrix symbol including registration features not having explicit segment identification information overlaid with an illustrative field of view not subtending the entire symbol, according to an embodiment.
Figure 11:
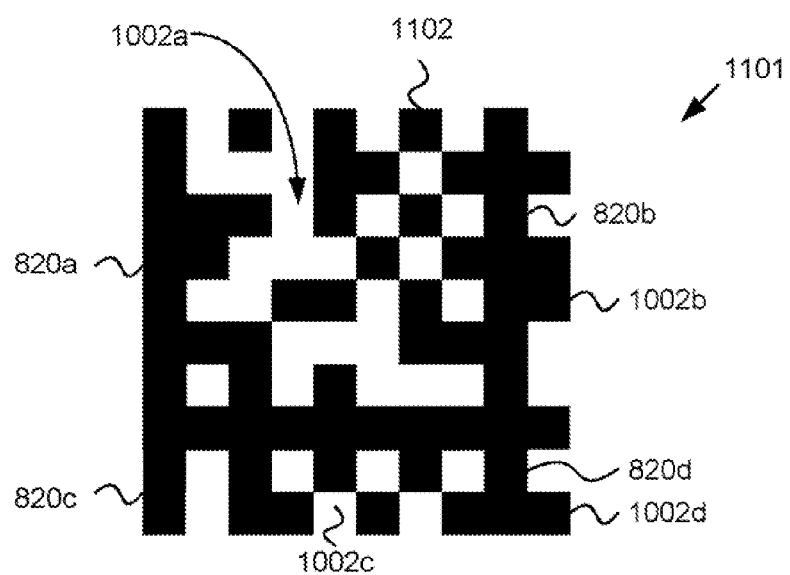
FIG. 11 is a depiction of a first image of a portion of the 2D matrix symbol of FIG. 10 corresponding to the overlaid field of view, according to an embodiment.

The process begins at step 902 where a first image is captured and placed in a data cache. The image may for example correspond to a field of view 104 such as is shown in FIGS. 1, 2, and 10. FIG. 11, symbol portion 1102 is an example of an image captured in step 902. Also in step 902, the image is analyzed to determine a segment value. This is described more fully in conjunction with step 906 below.

After completion of step 902, the process 901 then proceeds to step 904. In step 904, a next image is captured for analysis. For example, the image captured in step 904 may correspond substantially to a duplicate of the image captured in step 902, or may correspond to a different area of the symbol. For example, FIG. 12, symbol portion 1202 may correspond to a different area of the symbol captured in step 904.

Proceeding to step 906, a segment value is determined. For example, for a symbol approach 801 of FIG. 8, an image may include a segment identifier such as one or more of the segment identifiers 802, 806, 810, 814, and/or 818. According to an embodiment, image processing may be performed on the captured image to find a portion of a finder pattern 820, and the image sampled in regions positioned relative to the finder 820 to identify and decode a segment identifier 802, 806, 810, 814, and/or 818. According to another embodiment, image processing may be performed to determine the existence and position of a segment identifier in the captured next image without relying on the existence or position of a finder pattern 820. For example, a segment identifier may possess a characteristic pattern of bright spots in the frequency domain, may include at least one repeat of a characteristic shape in the spatial domain, may respond to a phase mask in a characteristic manner, may include a characteristic chipping signal along an axis, and/or may possess another characteristic response to one or more computational methods. An appropriate computation or series of computations is performed in step 906 to find an existence and location, and decode a value of a segment identification field within the captured next image. The image may then analyzed to determine that at least a part of the segment data field accompanies each segment identification field. If any decoded segment identification field does not have a corresponding segment data field in the image, its value is not output from step 906. A non-found or non-decoded segment identification field is another possible output from step 906.

In an embodiment of step 906, and especially for symbols that use a Gray Code segment identification schema, a 2D convolution may be performed against the pattern used for the segment separator and the phase of the resulting maximum response is noted for each separator pattern. The rows of cells containing the separator patterns and the data beyond the separator patterns are removed from the imaged pattern of the segment and pattern data is extracted from the segment using the indexing patterns at each end as reference points. The pattern data is then passed to a 2D bar code decoding program to be translated into a block of data and the data block is associated with the segment identification previously recovered from the phase information in the convolution operation.

The process of step 906 (and other steps that decode arrays of cells) may use one or more of several bar code decoding or image processing techniques. For example (repeating some techniques previously described), the processor may employ one or more of: performing a plurality of computational methods, image processing, performing a Fourier transform, a phase mask, a chipping sequence, a chipping sequence along an axis, pattern matching in the image domain, pattern matching in the frequency domain, finding bright spots in the frequency domain, synthesizing data from a neighboring data segment, pseudo-decoding data from a neighboring data segment, a finder pattern, finding parallel edges, finding a finder pattern, centers decoding, image resolution using a priori knowledge of symbol structure, closure decoding, edge finding, uniform acceleration compensation, surface de-warping, anti-aliasing, frame transformation, frame rotation, frame de-skewing, keystone correction, Gray Code, pattern phase, phase comparison, delta distance, local thresholding, global thresholding, modulation compensation, image inversion, inverted image projection, and sampling image regions positioned relative to a finder.

The process next proceeds to decision step 908. In step 908, the value of one or more segment identification fields found within the image captured in step 904 (and accompanied by its corresponding segment data field) is compared to previously captured segment data fields. If the new segment identifications are null or only include data segments already present in the cache, the process proceeds to step 910 where the latest image is discarded, and the process then loops back through the "capture next image" step 904. If there are new segments in the latest image, the process proceeds to step 912.

Figure 13:
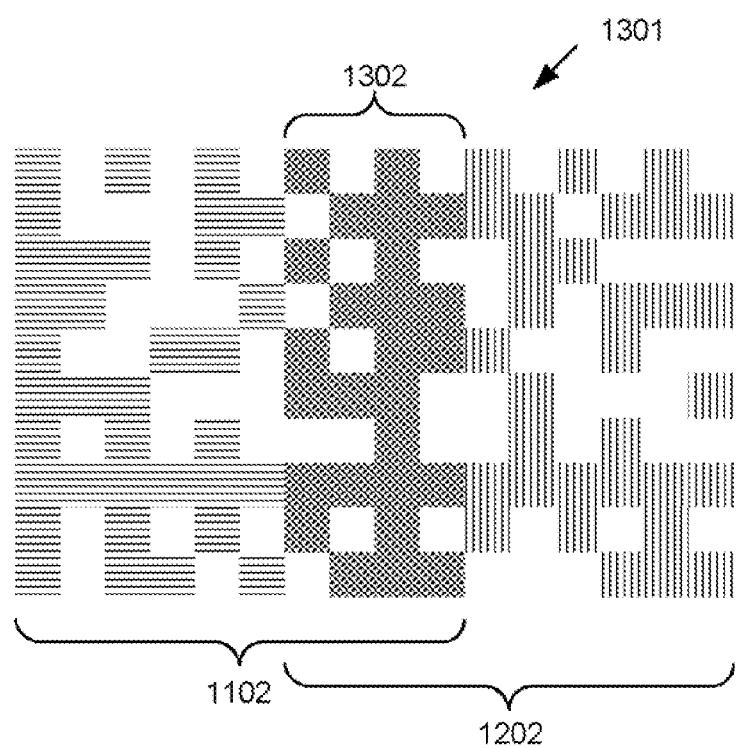
FIG. 13 is a depiction of a partial reconstruction of the 2D matrix symbol of FIG. 10, the partial reconstruction including the first and second partial 2D images of FIGS. 11 and 12, according to an embodiment.

In step 912, the latest image or data corresponding to the latest image is combined with images or data in the cache, and the cache updated with the superset image or data. For example, FIG. 13 illustrates an approach 1301 to combining the images in the image domain. A similar combination may be made in the data domain, wherein decoded data corresponding to the images is combined.

Proceeding to step 914, the image and/or the data is analyzed for completeness. For example, step 914 may perform image processing to determine if an image of an entire symbol is now in the cache, perform data processing to determine if the data from an entire symbol is in the cache or if all the segment values from the symbol are in the cache, or perform another test to determine completion of symbol reconstruction. Proceeding to step 916, if the entire symbol or substantially the entire symbol has been assembled in the cache, the process proceeds to step 920. Alternatively, if the entire set of data corresponding to the symbol or substantially the entire set of data has been determined, the process proceeds to step 920. If the entire symbol or data corresponding to the entire symbol has not been received, the process loops to step 918.

It may be impossible to reconstruct an entire symbol. For example, if the symbol is damaged, data segments residing in the damaged portion may simply defy recovery. Similarly, it may be that the process 901 has exceeded a maximum duration allowed for symbol reading. If the image analysis indicates no more data may be recovered or if a maximum time has elapsed, step 918 kicks the process out of the loop to step 920. If one or more "exit decode" criteria are not met in step 918, then the process loops back to step 904 and the process of reconstructing data or symbols continues.

If either the exit criteria of step 916 or 918 are met, then the process proceeds to step 920, where the data is output. Optionally, for embodiments where caching, comparison, and combination are performed in the image domain, step 920 may include decoding the image to provide the recovered symbol data. In step 920, the recovered symbol data may optionally be output to a file. The recovered symbol data may also be output to a user. For example, referring to FIG. 1, an audio file may be played back to a user through the output interface 118. Similarly a video file or other data type may be output via a corresponding transducer, display, etc. forming at least a portion of the output interface 118.

As indicated above, embodiments may involve reconstructing symbols that do not necessarily include explicit segment identification fields.

FIG. 10 is a depiction of a segmented 2D matrix symbol 102 including registration or indexing features and finder patterns 820a, 820b, 820c, and 820d. Symbol 102 does not have explicit embedded placement information, according to an embodiment. The registration features 820a-820d may be used to register corresponding data segments 1002a-1002d. The registration features 820a-820d of each data segment includes an L-shaped finder pattern below and to the left of the respective data segment 1002a-1002d and a series of clocking cells along the top and to the right of the respective data segment. The finder and indexing patterns shown in FIGS. 10-13 correspond to a type used for "Data Matrix", a symbology published by the American National Standards Institute (ANSI), The Association of Automatic Identification Equipment Manufacturers (AIM), and/or corresponding international standards organizations such as ISO, JTC1-SC31, etc. The actual patterns of cells depicted in FIGS. 10-13 are illustrative only and do not necessarily depict one or more valid Data Matrix symbols. The approach illustrated in FIGS. 10-13 may be applicable to other symbologies in addition to Data Matrix.

A partial image of the symbol 102 may be captured by a bar code reader, such as the reader 101 of FIG. 1 having a field of view 104 subtending less than the entire extent of the symbol.

FIG. 11 is a depiction 1101 of a first partial 2D image 1102 of the 2D matrix symbol 102 of FIG. 10 corresponding to the limited field of view 104, according to an embodiment. The partial image 1102 includes data registration feature 820a and corresponding data segment 1002a. Also present in the image 1102 is a portion of right-hand neighboring data registration feature 820b and a portion of the corresponding data segment 1002b; as well as a portion of the lower neighboring data registration feature 820c and corresponding data segment 1002c. A small portion of lower-right neighboring data registration feature 820d and corresponding data segment 1002d is also present in the partial image 1102.

Figure 12:
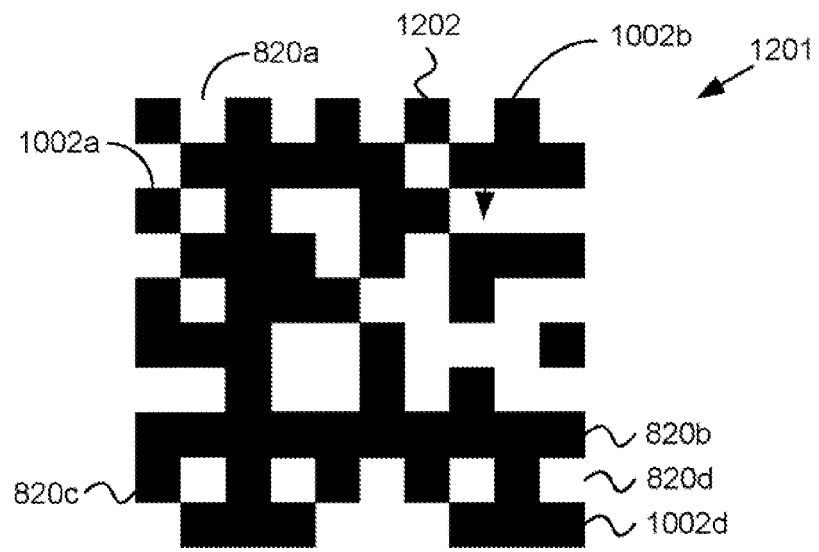
FIG. 12 is a depiction of a second partial image of the 2D matrix symbol of FIG. 10, according to an embodiment.

FIG. 12 is a depiction 1201 of a second partial image 1202 of the 2D matrix symbol 102 of FIG. 10, according to an embodiment. The partial image 1202 includes data registration feature 820b and corresponding data segment 1002b. Also present in the partial image 1202 is a portion of a left-hand neighboring finder and indexing pattern 820a, a vertical column of cells forming a clocking cells, and a portion of the corresponding data segment 1002a; shown as the leftmost column of cells extending just down to and abutting the row corresponding to the bottom of the "L" 820b. Image 1202 also includes a portion of the lower neighboring segment finder and indexing pattern (a row of clocking cells) 820d and a portion of the corresponding data segment 1002d including a row of data cells at the bottom edge of the image and just below the clocking cells 820d. A small portion of lower-left neighboring data segment finder and indexing pattern 820c is also present in the partial image 1202.

According to an embodiment, decoding or reconstruction software, corresponding for example to step 906 of the process 901 shown in FIG. 9, may synthesize segment identification information from respective data segments. For example, the rightmost column of cells in the image 1102 in FIG. 11 includes cells from the data field 1002b. This column of cells may be used as a functional segment identification field for determining the relative positions of data segments 1002a and 1002b. Similarly, the leftmost column of cells in the image 1202 in FIG. 12 includes cells from the data field 1002a. This column of cells may also be used as a functional segment identification field for determining the relative positions of data segments 1002a and 1002b.

FIG. 13 is a depiction of a partial reconstruction 1301 of the 2D matrix symbol 102 of FIG. 10, according to an embodiment. The partial reconstruction 1301 includes the first and second partial images, 1102 and 1202, respectively of FIGS. 11 and 12. While the finder and indexing features 820a-d of neighboring data segments may be substantially identical or indeterminate with respect to their particular identities, absent knowledge of the order of capturing the partial images 1102 and 1202, their corresponding data areas may provide unique identifying information.

As may be seen from inspection of the four data segments 1002a-1002d of FIG. 10, the patterns of cells in the respective segments are not identical along their borders with the finder and indexing patterns 820a-820b of neighboring segments. For example, the partial images 1102 and 1202 each share a region of overlap 1302 in which features may be matched to determine the relative positions of the data segments in the partial images 1102 and 1202. The amount of unique data for matching may be less than the entirety of the region 1302 because of the presence of the alignment (L-shaped) finder patterns and clocking tracks 1002a, 1002b present in the partial images 1102, 1202. However, the data segment portions 1002a, 1002b (columns of cells) may be unique and allow determinate matching of the partial images to their actual relative positions in the symbol 102.

In the example depicted, one column of data from data segment 1002a, the rightmost column seen in data segment 1002a of FIG. 10, is present in partial image 1202. Similarly, one column of data from data segment 1002b, the leftmost column seen in the data segment 1002b of FIG. 10, is present in partial image 1102. Comparing the data columns, no identical data columns were present in corresponding positions elsewhere in the symbol 102 of FIG. 10 and a determinate match could thus be made.

Referring to FIG. 13, the extent of the image 1102 and the image 1202 may be seen to overlap in the region 1302. Thus at least a portion of the pattern of cells in the region 1302 may be used to determine the relative positions of the images to reconstruct the superset 1301 of the two images. For ease of understanding, the overlapping cells in the two images 1102 and 1202 are shown in a checkerboard fill pattern. Cells that are only present in the image 1102 are shown in a horizontal crosshatch pattern. Cells that are only present in the image 1202 are shown in a vertical crosshatch pattern. The combined data are represented by (cache) image 1301. The fill patterns are not literally present in the reconstructed image 1301, but rather are shown in FIG. 13 for ease of understanding.

As an alternative to matching images, the data from the captured data segments may be decoded and the data from the captured neighboring data columns may be pseudo-decoded. For example, data in the rightmost column of region 1002a forms a pattern w-b-w-b-b-w (white, black, white, black, black, white) reading from top to bottom, starting immediately below the black horizontal clocking track cell. Accordingly, this may be assigned a pseudo-decode value of 010110, where black is assigned binary value 1 and white is assigned binary value 0. (The rightmost column of the finder and indexing pattern 820a is a vertical clocking track corresponding to 0101010, and lies to the right of the rightmost data column.) Similarly, the leftmost data column of data region 1002b may be pseudo-decoded to 101100, reading top-to-bottom and starting immediately below the white clocking track cell.

By inspection of the partial image 1102 of FIG. 11, it may be seen that the right hand column may be pseudo-decoded to 101100, which matches the leftmost data column of the data segment 1002b. Similarly, by inspection of the partial image 1202 of FIG. 12, it may be seen that the left hand column may be pseudo-decoded to 010110, which corresponds to the rightmost data column of the data segment 1002*a*. Hence one can deduce that the partial image 1202 lies immediately to the right of the partial image 1102.

The fully captured data segments 1002*a*-1002*d* may be actually decoded. By comparing decoded data regions and their pseudo-decoded neighboring data regions, the pseudo-decoded data may be matched, and substantially the entirety of the symbol 102 of FIG. 10 may be reconstructed in the data domain, rather than in the image domain.

Whether working in image domain or data domain, a greater or lesser number of neighboring columns or rows may be used to generate matching patterns or pseudo-data, according to the characteristics of the captured partial images.

Of course, whether working in the image domain, using image matching techniques, or working in the data domain, using data and pseudo-data matching, any given image may present indeterminate relationships, such as when two or more data segments include identical edge columns or rows. However, in many cases, the image may be determinately reconstructed by working around from other sides of the adjoining data segments. Finally, for indeterminate relationships that may arise, the decoded data from segments 1002*a*-1002*d* may be compared contextually to make a best guess at the geometric relationships between the data segments. Alternatively, segments of indeterminate locations may be omitted from playback or other expression.

Figure 14:
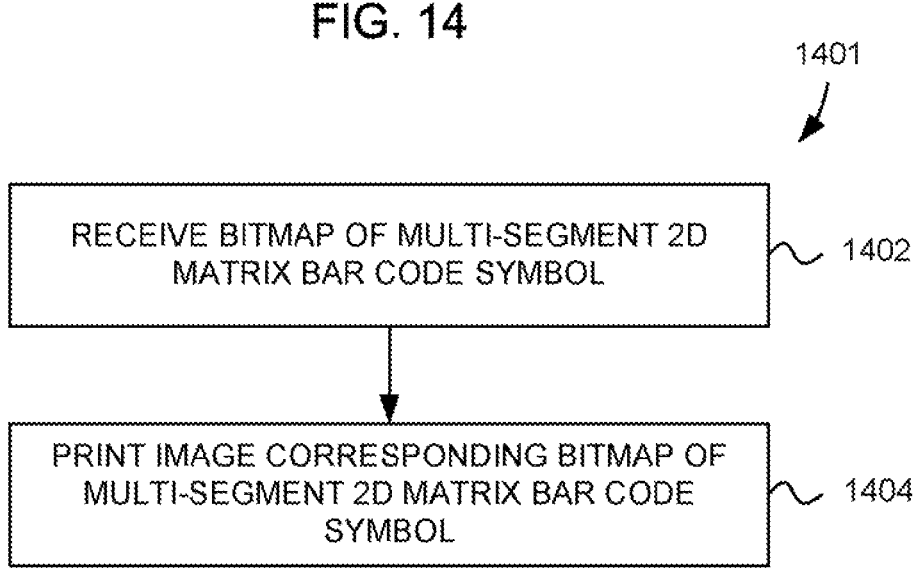
FIG. 14 is a flow chart showing a method for printing a 2D matrix bar code symbol including a plurality of segments from a received bitmap, according to an embodiment.

FIG. 14 is a flow chart showing a method 1401 for printing a 2D matrix bar code symbol including a plurality of segments from a received bitmap, according to an embodiment. Beginning with step 1402, a bitmap corresponding to a barcode symbol is received. The bar code symbol was formed by steps including dividing data into a first plurality of segments; separately encoding a second plurality of segments as corresponding arrays of cells; and arranging the arrays of cells in an abutting relationship including forming the bitmap of the arrays of cells. According to embodiments, the first and second pluralities are the same.

The bar code symbol represented by the received bitmap may also have been formed by bitmapping at least one framing feature. For example, the framing feature may include one or more of at least one finder pattern, at least one clocking pattern, at least one indexing pattern, and/or at least one segment identifier. Arranging the arrays of cells in an abutting relationship may include arranging the at least one framing feature and the arrays of cells in an abutting relationship. According to an embodiment, arranging the arrays of cells in an abutting relationship may include inserting the at least one framing feature between the abutting arrays of cells.

Proceeding to step 1404, the received bitmap image is printed. For example; printing the image corresponding to the bitmap may include executing a print command. Additionally or alternatively, printing the image corresponding to the bitmap may include transmitting the image as data from a computer to an electronic printer configured to receive the data and print a corresponding bar code symbol on a physical surface. Printing step 1404 may include printing the corresponding bar code symbol on a physical surface.

Figure 15:
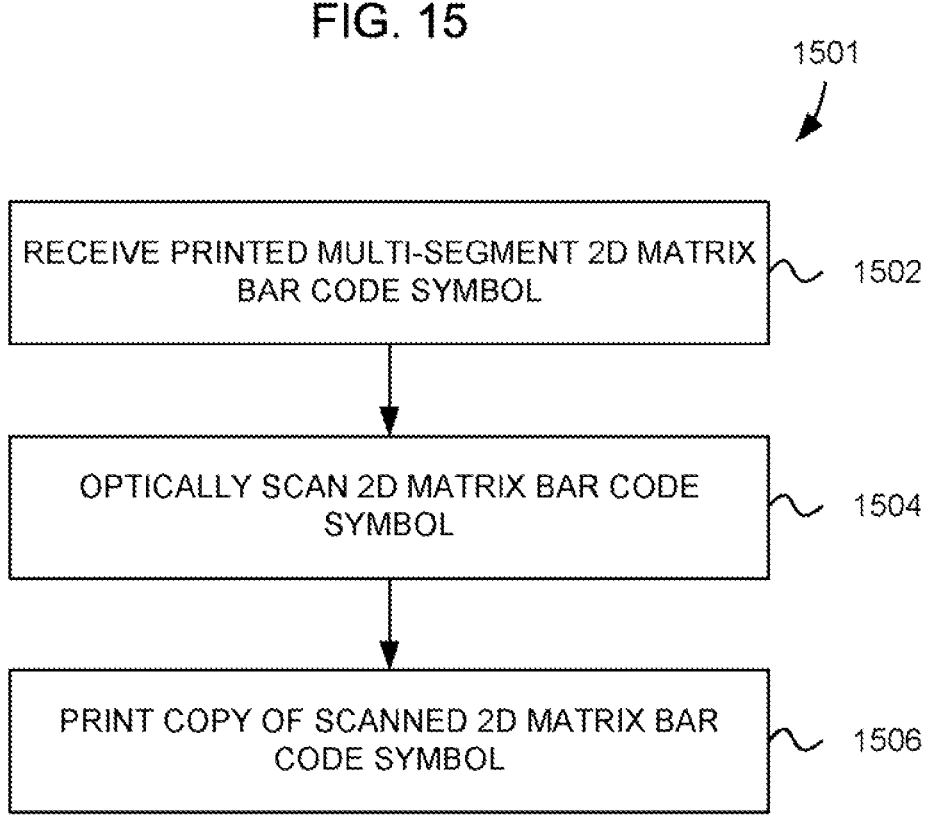
FIG. 15 is a flow chart showing a method for making a printed copy of a 2D matrix bar code symbol including a plurality of segments, according to an embodiment.

FIG. 15 is a flow chart showing a method 1501 for making a printed copy of a 2D matrix bar code symbol including a plurality of segments, according town embodiment. Beginning at step 1502, a printed bar code symbol is received. According to an embodiment, the received printed bar code symbol was formed by steps including: 1) dividing data into a first plurality of segments; 2) separately encoding a second plurality of segments as corresponding arrays of cells; 3) arranging the arrays of cells in an abutting relationship; and 4) printing the arrays of cells to form the printed bar code symbol. According to embodiments, the first and second pluralities are the same.

The printed bar code symbol received in step 1502 may include at least one framing feature selected from the group consisting of at least one finder pattern, at least one clocking pattern, at least one indexing pattern, and at least one segment identifier. Arranging the arrays of cells in an abutting relationship may include arranging the at least one framing feature and the arrays of cells in an abutting relationship. Arranging the arrays of cells in an abutting relationship may include inserting the at least one framing feature between the abutting arrays of cells.

Proceeding to step 1504, the printed bar codes symbol received in step 1502 is optically scanned. For example, step 1502 may include capturing a digital image or optically scanning the printed bar code symbol with an optical scanner to form a bitmap. Alternatively, step 1502 may include scanning the bar code symbol with a bar code scanner and decoding the scanned symbol to infer a bitmap.

Proceeding to step 1506, a printed copy is made of the scanned bar code symbol. For example, making a printed copy of the printed bar code symbol may include outputting the bitmap to a printing apparatus configured to print an image corresponding to the bitmap. According to another example, steps 1504 and 1506 may be combined, such as by performing electrophotographic (also referred to as xerographic) copying with a copy machine. According to another example, steps 1504 and 1506 may include scanning and transmitting a copy of the bar code symbol to a fax machine.

Referring to FIGS. 14 and 15, a bar code symbol reproduced by a method 1401 or 1501 (or alternatively, an original bar code symbol from which a reproduced bar code symbol is formed) may be scanned and decoded to retrieve data from the symbol. Such a symbol is generally formed as a plurality of arrays of cells in an abutting relationship, the arrays of cells corresponding to separately encoded segments of data divided from input data. According to embodiments, the input data may be or include audio input data. The reproduced bar code symbol is scanned. At least some of the arrays of cells are decoded. The separate encoding, and hence decodability of each of the arrays allows portions of the original input data to be retrieved, in contrast to all-or-nothing decoding of conventional bar code symbols. A decoding device or other device operably coupled to the decoding device may then output audio data corresponding to the audio input data encoded by the decoded arrays of cells. In other words, audio segments corresponding to non-decoded arrays of cells are not output, but rather may exist as blank spaces or be filled by white or pink noise to help mask the missing segments. Humans are very good at understanding audio messages even when the messages include missing or blank portions. Hence this capability is leveraged to provide a segmented data symbol that is robust overall (because of human capabilities), but which avoids undue amounts of error correction to ensure retrieval of each and every data segment.

Audio data may further be spread over a plurality of symbols prepared as pluralities of arrays of cells in an abutting relationship, the pluralities of arrays of cells corresponding to separately encoded segments of data divided from additional audio input data. Such an additional (e.g., second) symbol may likewise be decoded to retrieve data from at least some of the second arrays of cells, and audio data corresponding to the additional audio input data encoded by the second decoded arrays of cells may be output to a human listener.

The preceding overview, brief description of the drawings, and detailed description describe illustrative embodiments according to the present invention in a manner intended to foster ease of understanding by the reader. Other structures, methods, and equivalents may be within the scope of the invention. The scope of the invention described herein shall be limited only by the claims.

What is claimed is:

1. A method for reproducing a bar code symbol, comprising:
   receiving a bitmap corresponding to a non-concatenated binary two-dimensional matrix bar code symbol that was formed by steps including:
      dividing payload data into a plurality of segments;
      separately encoding each of the plurality of segments as a corresponding binary two-dimensional matrix array of cells;
      encoding, for each of the plurality of segments, a segment identification field; and
      arranging the binary two-dimensional matrix arrays of cells and segment identification fields in an abutting relationship; and
   printing a binary image corresponding to the bitmap;
   wherein each of the plurality of binary two-dimensional matrix arrays of cells, in combination with the corresponding segment identification field, is separately decodable from others of the plurality of binary two-dimensional matrix arrays of cells.

2. The method for reproducing a bar code symbol of claim 1, wherein the steps for forming the bitmap corresponding to the bar code symbol include:
   bitmapping at least one framing feature selected from the group consisting of at least one finder pattern, at least one clocking pattern, at least one indexing pattern, and at least one segment identifier; and
   wherein arranging the arrays of cells in an abutting relationship includes arranging the at least one framing feature and the arrays of cells in an abutting relationship.

3. The method for reproducing a bar code symbol of claim 1, wherein the steps for forming the bitmap corresponding to the bar code symbol include:
   bitmapping at least one framing feature selected from the group consisting of at least one finder pattern, at least one clocking pattern, at least one indexing pattern, and at least one segment identifier; and
   wherein arranging the arrays of cells in an abutting relationship includes inserting the at least one framing feature between the abutting arrays of cells.

4. The method for reproducing a bar code symbol of claim 1, wherein printing the image corresponding to the bitmap includes:
   executing a print command.

5. The method for reproducing a bar code symbol of claim 1, wherein printing the image corresponding to the bitmap includes:
   transmitting the image as data from a computer to an electronic printer configured to receive the data and print a corresponding bar code symbol on a physical surface.

6. A method for reproducing a bar code symbol, comprising:
   receiving a printed non-concatenated binary two-dimensional matrix bar code symbol that was formed by steps including:
      dividing payload data into a plurality of segments;
      separately encoding each of the plurality of segments as corresponding binary two-dimensional matrix arrays of cells;
      encoding, for each of the second plurality of segments, a segment identification field;
      arranging the binary two-dimensional matrix arrays of cells and segment identification fields in abutting relationships; and
      printing the binary two-dimensional matrix arrays of cells and segment identification fields to form the printed bar code symbol; and
   making a printed copy of the printed non-concatenated binary two-dimensional matrix bar code symbol;
   wherein each of the plurality of binary two-dimensional matrix of arrays of cells, in combination with the corresponding segment identification field, is separately decodable from others of the second plurality of binary two-dimensional matrix arrays of cells.

7. The method for reproducing a bar code symbol of claim 6, wherein the steps for printing the bar code symbol include:
   printing at least one framing feature selected from the group consisting of at least one finder pattern, at least one clocking pattern, at least one indexing pattern, and at least one segment identifier; and
   wherein arranging the arrays of cells in an abutting relationship includes arranging the at least one framing feature and the arrays of cells in an abutting relationship.

8. The method for reproducing a bar code symbol of claim 6, wherein the steps for printing the bar code symbol include:
   printing at least one framing feature selected from the group consisting of at least one finder pattern, at least one clocking pattern, at least one indexing pattern, and at least one segment identifier; and
   wherein arranging the arrays of cells in an abutting relationship includes inserting the at least one framing feature between the abutting arrays of cells.

9. The method for reproducing a bar code symbol of claim 6, wherein making a printed copy of the printed bar code symbol includes:
   scanning the printed bar code symbol with an optical scanner to form a bitmap; and
   outputting the bitmap to a printing apparatus configured to print an image corresponding to the bitmap.

10. The method for reproducing a bar code symbol of claim 6, wherein making a printed copy of the printed bar code symbol includes:
    performing electrophotographic copying with a copy machine.

11. The method for reproducing a bar code symbol of claim 6, wherein making a printed copy of the printed bar code symbol includes:
    scanning and transmitting a copy of the printed bar code symbol to a fax machine.

12. A method for reading a bar code symbol, comprising:
    scanning a non-concatenated binary two-dimensional matrix bar code symbol formed as a plurality of binary two-dimensional matrix arrays of cells and corresponding segment identification fields in an abutting relationship, the binary two-dimensional matrix arrays of cells corresponding to separately encoded segments of payload data divided from audio input data;
    separately decoding each of at least some of the binary two-dimensional matrix arrays of cells; and
    outputting audio data corresponding to the audio input data encoded by the decoded binary two-dimensional matrix arrays of cells.

13. The method for reading a bar code symbol of claim 12, wherein outputting audio data corresponding to the audio input data encoded by the decoded arrays of cells includes not outputting audio data corresponding to the audio input data encoded by non-decoded arrays of cells.

14. The method for reading a bar code symbol of claim 12, further comprising:
  transducing the output audio data to play a corresponding audio signal.

15. The method for reading a bar code symbol of claim 14, further comprising:
  not playing an audio signal corresponding to arrays of cells that were not decoded.

16. The method for reading a bar code symbol of claim 12, further comprising:
  dividing the audio input data into a first plurality of segments;
  separately encoding a second plurality of the segments as corresponding arrays of cells; and
  arranging the arrays of cells in an abutting relationship.

17. The method for reading a bar code symbol of claim 12, further comprising:
  scanning a second bar code symbol formed as a second plurality of arrays of cells in an abutting relationship, the second arrays of cells corresponding to separately encoded segments of data divided from second audio input data;
  decoding at least some of the second arrays of cells; and
  outputting audio data corresponding to the second audio input data encoded by the second decoded arrays of cells.

18. The method for reading a bar code symbol of claim 12, wherein the bar code symbol is produced by printing a bitmap of the arrays of cells arranged in the abutting relationship, by copying the bar code symbol with a photocopier, or by scanning and printing a copy of an original bar code symbol using a scanner and printer.

* * * * *